US 9,807,196 B2
Oct. 31, 2017

(54) AUTOMATED SOCIAL NETWORK INTERACTION SYSTEM FOR A VEHICLE

(71) Applicant: Toyota Motor Sales, U.S.A., Inc., Torrance, CA (US)

(72) Inventor: James T. Pisz, Huntington Beach, CA (US)

(73) Assignee: Toyota Motor Sales, U.S.A., Torrance, CA (US)

(\*) Notice: Subject to any disclaimer, the term of this patent is extended or adjusted under 35 U.S.C. 154(b) by 18 days.

(21) Appl. No.: 14/639,695

(22) Filed: Mar. 5, 2015

(65) Prior Publication Data

US 2015/0180999 A1  Jun. 25, 2015

Related U.S. Application Data

(63) Continuation-in-part of application No. 14/175,862, filed on Feb. 7, 2014, now Pat. No. 9,340,155, and a continuation-in-part of application No. 14/180,563, filed on Feb. 14, 2014.

(60) Provisional application No. 61/878,898, filed on Sep. 17, 2013.

(51) Int. Cl.
  *G01C 21/36* (2006.01)
  *H04L 29/08* (2006.01)
  (Continued)

(52) U.S. Cl.
  CPC ............ *H04L 67/306* (2013.01); *B60K 35/00* (2013.01); *B60K 37/00* (2013.01); *G01C 21/365* (2013.01);
  (Continued)

(58) Field of Classification Search
  None
  See application file for complete search history.

(56) References Cited

U.S. PATENT DOCUMENTS

| 3,129,862 A | 4/1964 | Cone |
| 3,713,090 A | 1/1973 | Dickinson |

(Continued)

FOREIGN PATENT DOCUMENTS

| CN | 101855519 A | 10/2010 |
| CN | 102442250 A | 5/2012 |

(Continued)

OTHER PUBLICATIONS

International Search Report and Written Opinion for PCT/US2015/046626, dated Dec. 7, 2015, 17 pgs.

(Continued)

*Primary Examiner* — Navid Ziaeianmehdizadeh
(74) *Attorney, Agent, or Firm* — Christopher G. Darrow; Darrow Mustafa PC

(57) ABSTRACT

In various aspects, the present disclosure provides a system and a related non-transitory computer-readable medium for performing operations incorporating social networking functions into a vehicle. The system can include a user identification subsystem that is configured to detect and identify a user. The system can also include an interactive display subsystem that is configured to generate output for display on a vehicle window. The displayed output generally includes social networking content. The social networking content can include "upload content," "download content," or both.

11 Claims, 15 Drawing Sheets

(51) Int. Cl.
*B60K 35/00* (2006.01)
*B60K 37/00* (2006.01)
*G02B 27/01* (2006.01)
*G07C 9/00* (2006.01)
*G06F 3/01* (2006.01)
*G06K 9/00* (2006.01)

(52) U.S. Cl.
CPC ..... *G01C 21/3688* (2013.01); *G01C 21/3697* (2013.01); *G02B 27/01* (2013.01); *G07C 9/00031* (2013.01); *H04L 67/12* (2013.01); *H04L 67/18* (2013.01); *B60K 2350/2052* (2013.01); *G02B 2027/014* (2013.01); *G02B 2027/0187* (2013.01); *G06F 3/017* (2013.01); *G06K 9/00221* (2013.01)

(56) References Cited

U.S. PATENT DOCUMENTS

| | | | |
|---|---|---|---|
| 4,658,612 | A | 4/1987 | Eisermann |
| 4,818,048 | A | 4/1989 | Moss |
| 4,942,841 | A | 7/1990 | Drucker, Jr. |
| 4,994,204 | A | 2/1991 | Doane et al. |
| 5,240,636 | A | 8/1993 | Doane et al. |
| 5,454,074 | A | 9/1995 | Hartel et al. |
| 5,574,641 | A | 11/1996 | Kawakami et al. |
| 5,580,140 | A | 12/1996 | Katz et al. |
| 5,589,958 | A | 12/1996 | Lieb |
| 5,652,564 | A | 7/1997 | Winbush |
| 5,705,977 | A | 1/1998 | Jones |
| 5,774,591 | A | 6/1998 | Black et al. |
| 5,784,036 | A | 7/1998 | Higuchi et al. |
| 5,867,802 | A | 2/1999 | Borza |
| 5,920,363 | A | 7/1999 | Rofe |
| 6,227,862 | B1 | 5/2001 | Harkness |
| 6,249,720 | B1 | 6/2001 | Kubota et al. |
| 6,285,952 | B1 | 9/2001 | Kim |
| 6,362,734 | B1 | 3/2002 | McQuade et al. |
| 6,393,348 | B1 | 5/2002 | Ziegler et al. |
| 6,522,027 | B1 | 2/2003 | Morillon |
| 6,654,070 | B1 | 11/2003 | Rofe |
| 6,696,943 | B1 | 2/2004 | Elrod et al. |
| 6,735,517 | B2 | 5/2004 | Engelsberg et al. |
| 6,791,462 | B2 | 9/2004 | Choi |
| 7,050,606 | B2 | 5/2006 | Paul et al. |
| 7,053,866 | B1 | 5/2006 | Mimran |
| 7,126,583 | B1 | 10/2006 | Breed |
| 7,126,853 | B2 | 10/2006 | Kim |
| 7,224,325 | B2 | 5/2007 | Nagano et al. |
| 7,248,151 | B2 | 7/2007 | McCall |
| 7,398,140 | B2 | 7/2008 | Kernwein et al. |
| 7,561,966 | B2 | 7/2009 | Nakamura et al. |
| 7,561,996 | B2 | 7/2009 | Lu et al. |
| 7,764,247 | B2 | 7/2010 | Blanco et al. |
| 7,847,678 | B2 | 12/2010 | Kawamata et al. |
| 7,897,888 | B2 | 3/2011 | Dimig |
| 7,982,620 | B2 | 7/2011 | Prokhorov et al. |
| 8,096,069 | B2 | 1/2012 | Ishikawa |
| 8,120,651 | B2 | 2/2012 | Ennis |
| 8,317,329 | B2 | 11/2012 | Seder et al. |
| 8,344,870 | B2 | 1/2013 | Evans et al. |
| 8,395,529 | B2 | 3/2013 | Seder et al. |
| 8,463,488 | B1 | 6/2013 | Hart |
| 8,523,667 | B2 | 9/2013 | Clavin et al. |
| 8,527,146 | B1* | 9/2013 | Jackson ............ B60W 50/0098 180/273 |
| 8,552,847 | B1 | 10/2013 | Hill |
| 8,560,013 | B2 | 10/2013 | Jotanovic |
| 8,577,543 | B2 | 11/2013 | Basir et al. |
| 8,633,979 | B2 | 1/2014 | Szczerba et al. |
| 8,818,647 | B2 | 8/2014 | Breed |
| 8,924,076 | B2 | 12/2014 | Boote et al. |
| 8,942,428 | B2 | 1/2015 | Snook et al. |
| 9,037,354 | B2 | 5/2015 | Mondragon et al. |
| 9,083,581 | B1 | 7/2015 | Addepalli et al. |
| 9,293,042 | B1* | 3/2016 | Wasserman ............ G07C 5/006 |
| 2002/0022979 | A1 | 2/2002 | Whipp et al. |
| 2002/0029103 | A1 | 3/2002 | Breed et al. |
| 2002/0067289 | A1 | 6/2002 | Smith |
| 2002/0091473 | A1 | 7/2002 | Gardner et al. |
| 2002/0126876 | A1 | 9/2002 | Paul et al. |
| 2003/0034958 | A1 | 2/2003 | Waesterlid |
| 2003/0076968 | A1 | 4/2003 | Rast |
| 2003/0190076 | A1 | 10/2003 | DeLean |
| 2003/0204526 | A1 | 10/2003 | Salehi-Had |
| 2004/0052418 | A1 | 3/2004 | DeLean |
| 2004/0137877 | A1 | 7/2004 | Crowhurst et al. |
| 2004/0208496 | A1 | 10/2004 | Pilu |
| 2005/0125669 | A1 | 6/2005 | Stewart et al. |
| 2005/0271279 | A1 | 12/2005 | Fujimura et al. |
| 2006/0012679 | A1 | 1/2006 | Ressler |
| 2006/0078691 | A1 | 4/2006 | Cherif et al. |
| 2006/0145825 | A1* | 7/2006 | McCall ............ B60R 25/2045 340/426.35 |
| 2007/0027621 | A1 | 2/2007 | Operowsky et al. |
| 2007/0298885 | A1 | 12/2007 | Trab |
| 2008/0048930 | A1 | 2/2008 | Brred |
| 2008/0051946 | A1 | 2/2008 | Brred |
| 2008/0167892 | A1 | 7/2008 | Clark |
| 2008/0174451 | A1 | 7/2008 | Harrington et al. |
| 2008/0195428 | A1 | 8/2008 | O'Sullivan |
| 2008/0212196 | A1 | 9/2008 | Watanabe et al. |
| 2008/0238667 | A1 | 10/2008 | Olson |
| 2008/0255731 | A1 | 10/2008 | Mita et al. |
| 2009/0067449 | A1 | 3/2009 | Tian |
| 2009/0146947 | A1 | 6/2009 | Ng |
| 2009/0264082 | A1 | 10/2009 | Tieman et al. |
| 2009/0278915 | A1 | 11/2009 | Kramer et al. |
| 2009/0290021 | A1 | 11/2009 | Rudesill et al. |
| 2010/0045451 | A1 | 2/2010 | Periwal |
| 2010/0075656 | A1 | 3/2010 | Howarter et al. |
| 2010/0083373 | A1 | 4/2010 | White et al. |
| 2010/0127847 | A1* | 5/2010 | Evans ................ G06F 3/04817 340/461 |
| 2010/0225487 | A1 | 9/2010 | Desjardins |
| 2010/0253493 | A1 | 10/2010 | Szczerba et al. |
| 2011/0001932 | A1 | 1/2011 | Zuehlsdorff |
| 2011/0010056 | A1 | 1/2011 | Inayoshi et al. |
| 2011/0045842 | A1* | 2/2011 | Rork .................. H04L 12/5865 455/456.1 |
| 2011/0171941 | A1 | 7/2011 | Cusick et al. |
| 2011/0193939 | A1 | 8/2011 | Vassigh et al. |
| 2011/0271198 | A1 | 11/2011 | Brakensiek et al. |
| 2012/0044352 | A1 | 2/2012 | Aimura et al. |
| 2012/0089273 | A1* | 4/2012 | Seder .................... B60Q 1/268 701/2 |
| 2012/0105226 | A1 | 5/2012 | Bourdeau et al. |
| 2012/0209468 | A1 | 8/2012 | Thomas |
| 2012/0232749 | A1 | 9/2012 | Schoenberg et al. |
| 2012/0262403 | A1 | 10/2012 | Tissot |
| 2012/0265814 | A1 | 10/2012 | Roussis |
| 2012/0296559 | A1 | 11/2012 | Gueziez et al. |
| 2013/0030645 | A1 | 1/2013 | Divine et al. |
| 2013/0054701 | A1* | 2/2013 | Leeder .................. G06Q 50/01 709/205 |
| 2013/0063336 | A1 | 3/2013 | Sugimoto et al. |
| 2013/0066526 | A1 | 3/2013 | Mondragon et al. |
| 2013/0166391 | A1* | 6/2013 | Blow ...................... H04L 67/06 705/14.66 |
| 2013/0231800 | A1 | 9/2013 | Ricci |
| 2013/0238165 | A1 | 9/2013 | Garrett et al. |
| 2013/0244634 | A1 | 9/2013 | Garrett et al. |
| 2013/0258693 | A1 | 10/2013 | Hatakeyama et al. |
| 2013/0261871 | A1 | 10/2013 | Hobbs et al. |
| 2013/0300644 | A1 | 11/2013 | Chen et al. |
| 2014/0007618 | A1 | 1/2014 | Brown, III |
| 2014/0068713 | A1 | 3/2014 | Nocholson et al. |
| 2014/0082676 | A1 | 3/2014 | Barowski et al. |
| 2014/0129605 | A1* | 5/2014 | Huang ................ G06Q 30/0277 709/201 |
| 2014/0239982 | A1 | 8/2014 | Alameh |
| 2014/0282931 | A1 | 9/2014 | Protopapas |
| 2014/0300461 | A1 | 10/2014 | Stark |

(56) References Cited

U.S. PATENT DOCUMENTS

| | | |
|---|---|---|
| 2014/0372867 A1 | 12/2014 | Tidhar et al. |
| 2014/0379175 A1 | 12/2014 | Mittermeier |
| 2015/0077235 A1 | 3/2015 | Pisz et al. |
| 2015/0077237 A1 | 3/2015 | Chou et al. |
| 2015/0077272 A1 | 3/2015 | Pisz et al. |
| 2015/0077327 A1 | 3/2015 | Pisz et al. |
| 2015/0077561 A1 | 3/2015 | Schulz |
| 2015/0081133 A1 | 3/2015 | Schulz |
| 2015/0081167 A1 | 3/2015 | Pisz et al. |
| 2015/0220991 A1 | 8/2015 | Butts et al. |

FOREIGN PATENT DOCUMENTS

| | | |
|---|---|---|
| CN | 102745141 A | 10/2012 |
| CN | 102914317 A | 2/2013 |
| CN | 103158618 A | 6/2013 |
| CN | 103273885 | 9/2013 |
| DE | 102012203535 A1 | 9/2013 |
| EP | 1970265 A2 | 9/2008 |
| EP | 2441635 A1 | 4/2012 |
| EP | 268996 A1 | 1/2014 |
| KR | 1020070049338 | 5/2007 |
| WO | 2013034556 A1 | 3/2013 |
| WO | 2013101046 A1 | 7/2013 |

OTHER PUBLICATIONS

Apple Inc., "Apple CarPlay the best iPhone experience on four wheels.", 2104 in 29 Pages.

Fleischfresser, "GM Explores Interactive Backseat Windows", printed from http://www.smartplanet.com/blog/transportation/gm-explore-interactive-backseat-windows/1335 on Sep. 10, 2013 in 2 pages.

Nick Jaynes, (Smart) Walch Your Mercedes From Afar with Pebble Technology on Your Wrist, Dec. 23, 2013, in 3 pages.

* cited by examiner

AUTOMATED SOCIAL NETWORK INTERACTION SYSTEM FOR A VEHICLE

CROSS-REFERENCE TO RELATED APPLICATIONS

The present disclosure is a Continuation-In-Part of U.S. patent application Ser. No. 14/175,862, filed Feb. 7, 2014, which claims priority to U.S. Provisional Patent Application Ser. No. 61/878,898, filed Sep. 17, 2013. The present disclosure is also a Continuation-In-Part of U.S. patent application Ser. No. 14/180,563, filed Feb. 14, 2014, which claims priority to U.S. Provisional Patent Application Ser. No. 61/878,898, filed Sep. 17, 2013. Each of the aforementioned documents is incorporated by reference herein in its entirety.

BACKGROUND

The present disclosure generally relates to automated systems for a vehicle.

Vehicles often include various systems such as infotainment and navigation systems. These systems are generally provided with a display around which mechanical control elements are arranged to provide a user interface mounted in a dashboard of a vehicle for driver and front passenger access. Alternatively, the display combines at least some of the control elements into a touch panel display.

With the ever growing popularity and commercial significance of online social media systems, vehicle drivers and/or passengers may want to view or communicate with online social networks. In the case of a driver, such interaction could potentially be distracting and/or lead to increased drive times. Improved ease of use and/or improved integration of online social networking services with onboard vehicle systems can provide a more enjoyable and informative traveling experience for drivers and passengers and can potentially lessen driver distraction.

SUMMARY

In various aspects, the present disclosure provides a system and a related non-transitory computer-readable medium for performing operations incorporating social networking functions into a vehicle. The system can include a user identification subsystem that is configured to detect and identify a user. The system can also include an interactive display subsystem that is configured to generate output for display on a vehicle window. The displayed output generally includes social networking content. The social networking content can include "upload content," "download content," or both. "Upload content" refers to content that is created by the user and/or the system for transmission to a social networking service, and "download content" refers to content that is received from a social networking service.

The non-transitory computer-readable medium contains instructions that, when executed by one or more processors, perform operations related to an automated social network interaction system for a vehicle. The operations include identifying a vehicle user and logging the user into a social networking service. The operations additionally include receiving download content from the social networking service, and displaying the download content on a vehicle window.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
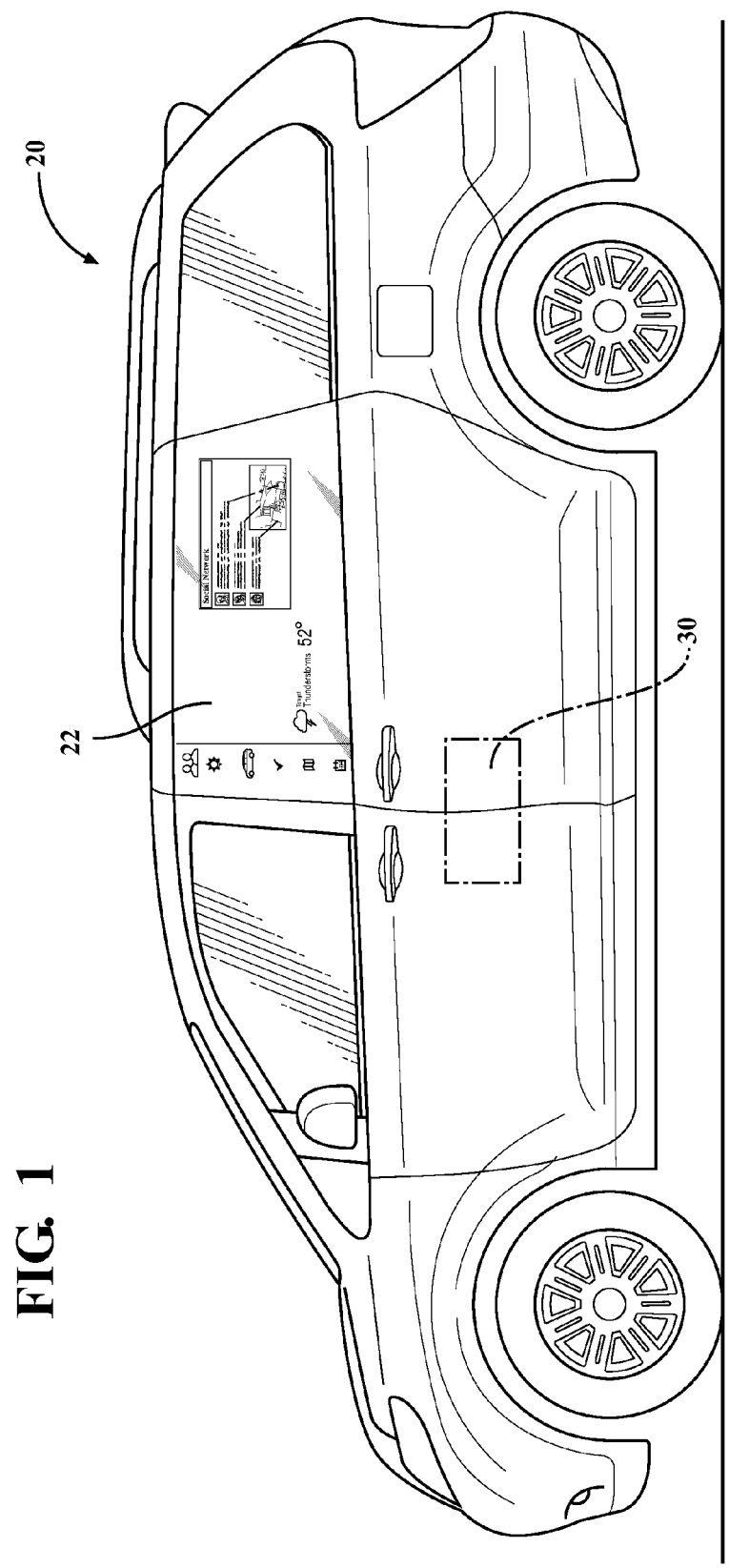
FIG. 1 is a pictorial representation of an exemplary vehicle having a system for automated interaction with a social networking service.

The present disclosure provides a system that incorporates social networking functionality into a vehicle. The system can automatically execute social networking functions for a user in some instances, and can make social networking functions easier for the user to perform in other cases. Examples include automatically identifying a user and logging the user into one or more social networking services, downloading content from a social networking service and displaying the content on an interactive display integrated in a vehicle window, and automatically creating content and/or uploading content to a social networking service. In one particular variation of the last example, the system can be configured to transmit content that provides updates on a trip status at regular intervals. This particular variation of automated content can include pre-determined textual messages, automatically acquired photographs, or the like. The system can thus make use of the vehicle more entertaining and informative for a user (including a driver and other passengers) and can potentially decrease driver distraction while the vehicle is moving.

The system generally includes a user identification subsystem that is configured to detect the presence of a user inside or nearby outside the vehicle, and to identify the user. In many instances, the user identification subsystem will have access to stored user profiles that can contain, among other things, social network service registration information for the user, including online addresses and login information. The system also generally includes an interactive display subsystem that is configured to display content received from one or more social networking services on a vehicle window for viewing from inside or outside, and in many cases, to receive input from the user.

The phrase "social networking service," as used herein, refers to an online, computer-based forum for social interaction, typically between people who have registered for, or otherwise obtained, membership with the service. A person who uses a social networking service can thus be referred to as a service registrant. A social networking service typically provides content to its service registrants, at least some of this content being created by other service registrants. In many social networking services, a first service registrant has the option to provide content exclusively or especially to one or more particular other service registrants, and/or to receive content exclusively or especially from the one or more particular other service registrants. In reference to either of these situations or to the two in combination, the one or more particular other service registrants will be referred to herein as "social networking associate(s)" of the first service registrant. In particular circumstances, a social networking associate will be a second service registrant with whom the first service registrant has mutually agreed to especially or exclusively share content as compared to a service non-associate.

Content that is exchanged on a social networking service and/or that is intended for exchange on a social networking service are referred to herein as "social networking content." Two categories of social networking content are discussed herein: "upload content" and "download content." "Upload content" generally refers to content that is created by a user of the presently disclosed system 30, by a vehicle having the system, or both, for transmission to a social networking service. "Download content" generally refers to content that is received from a social networking service. Such transmission and receipt of content can be done via a cellular network or other communication interface such as an application running on the cloud 70 based system.

As used herein, the term "driver" refers to a person who drives or intends to imminently drive or otherwise control operation of the vehicle. The term "passenger" refers to any system user or vehicle occupant who is not a driver. As used herein, the term "user" refers to a person contained in any of the following categories: a person who is using the disclosed system, a person who imminently intends to use the disclosed system, a person who has personal information stored in a user profile. The last of these is described below.

FIG. 1 schematically illustrates a vehicle 20 with a window 22 and an automated social network interaction system 30. Content received from a social networking service is displayed on the window 22 at a size and orientation so that it can be easily viewed and/or read by a person located outside of and near to the window 22. Although the window 22 is here shown as a driver's side passenger window of a minivan type vehicle in the example of FIG. 1, it should be understood that a display of the type shown in FIG. 1 can be positioned on any suitably sized window, and on any number of suitably sized windows, on any vehicle.

Figure 2:
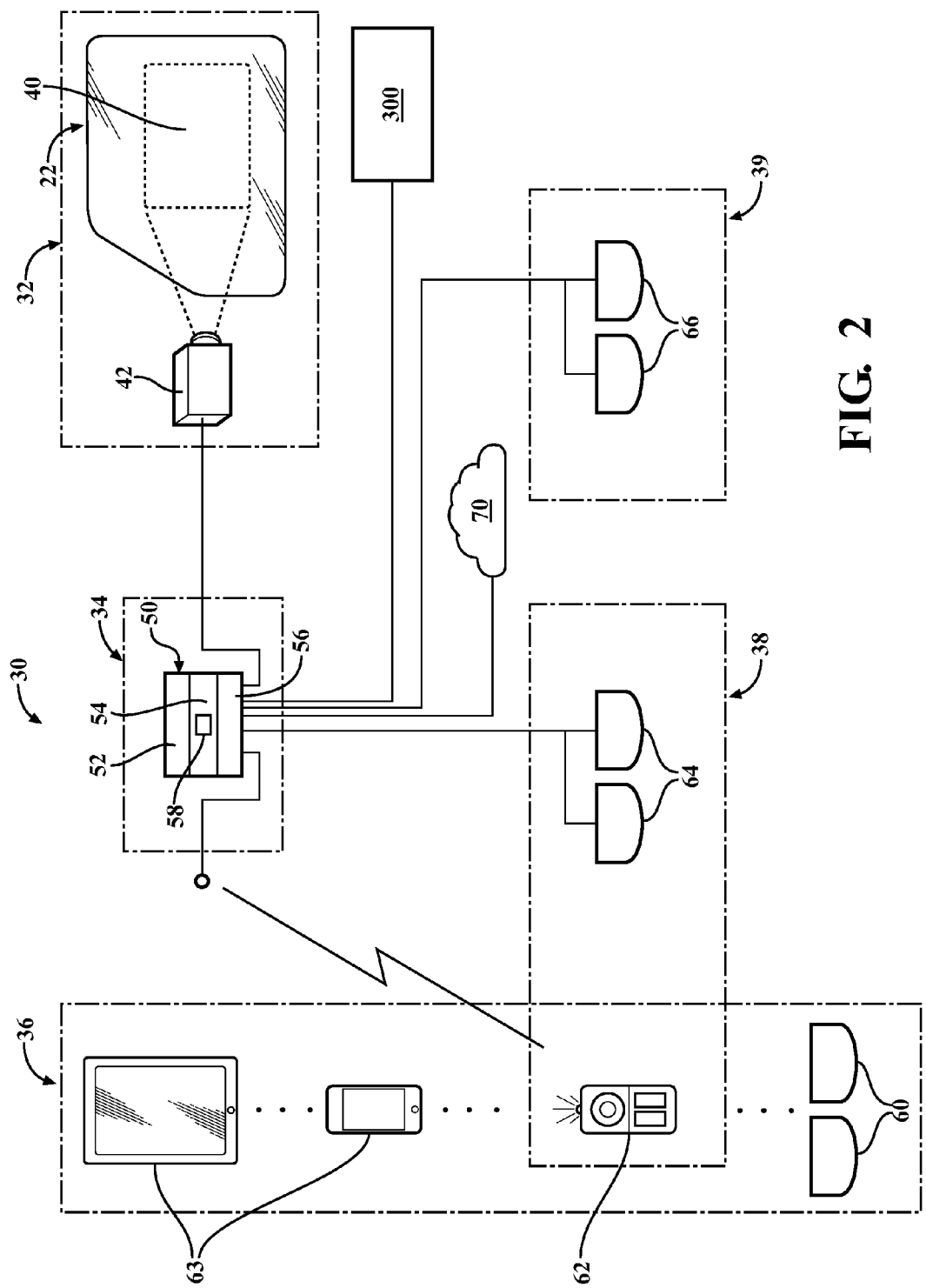
FIG. 2 is a schematic block diagram of the system for automated interaction with a social networking service according to one non-limiting embodiment.

FIG. 2 provides an exemplary schematic view of possible functional relationships between various components that can be included in the system 30. In different implementations, the system 30 can include any of an interactive display subsystem 32, a control subsystem 34, an input subsystem 36, a user identification subsystem 38, and a user location subsystem 39. It should be appreciated that although particular subsystems are separately defined, each or any of the subsystems may be combined or segregated via hardware and/or software of the system 30. Additionally, each or any of the subsystems can be implemented using one or more computing devices including conventional processors, central processing units, or other devices capable of manipulating or processing information.

The interactive display subsystem 32 can include any device or devices capable of displaying images on a vehicle window 22 under the control of system 30, and content displayed by the interactive display subsystem 32 can be adapted for viewing from outside the vehicle, inside the vehicle, or both. The interactive display subsystem 32 can particularly be configured to social networking content on one or more windows 22 of the vehicle 20. In some instances, the interactive display subsystem can be configured to display download content on one or more windows 22 of the vehicle 20. Social networking content displayed by the interactive display subsystem 32 can include any social networking content, such as text written or photographs created by a user's social networking associates, videos, links to other content, or any other available type. In instances where audio/visual content is retrieved from a social networking service, the audio component can be played through one or more vehicle speakers.

In one non-limiting example, the interactive display subsystem 32 can include a display device integral to the window 22, such as an LCD. Such a display can be illuminated by ambient light or by one or more light sources under the control of system 30. Such light sources can be mounted at any operable locations enabling light projection onto a window from inside or outside the vehicle, depending on whether the display is to be viewed by a user located outside or inside the vehicle. Examples of such mounting locations can include in the floor, in the vehicle headliner, within a vehicle door structure, or in an exterior door panel.

Figure 3:
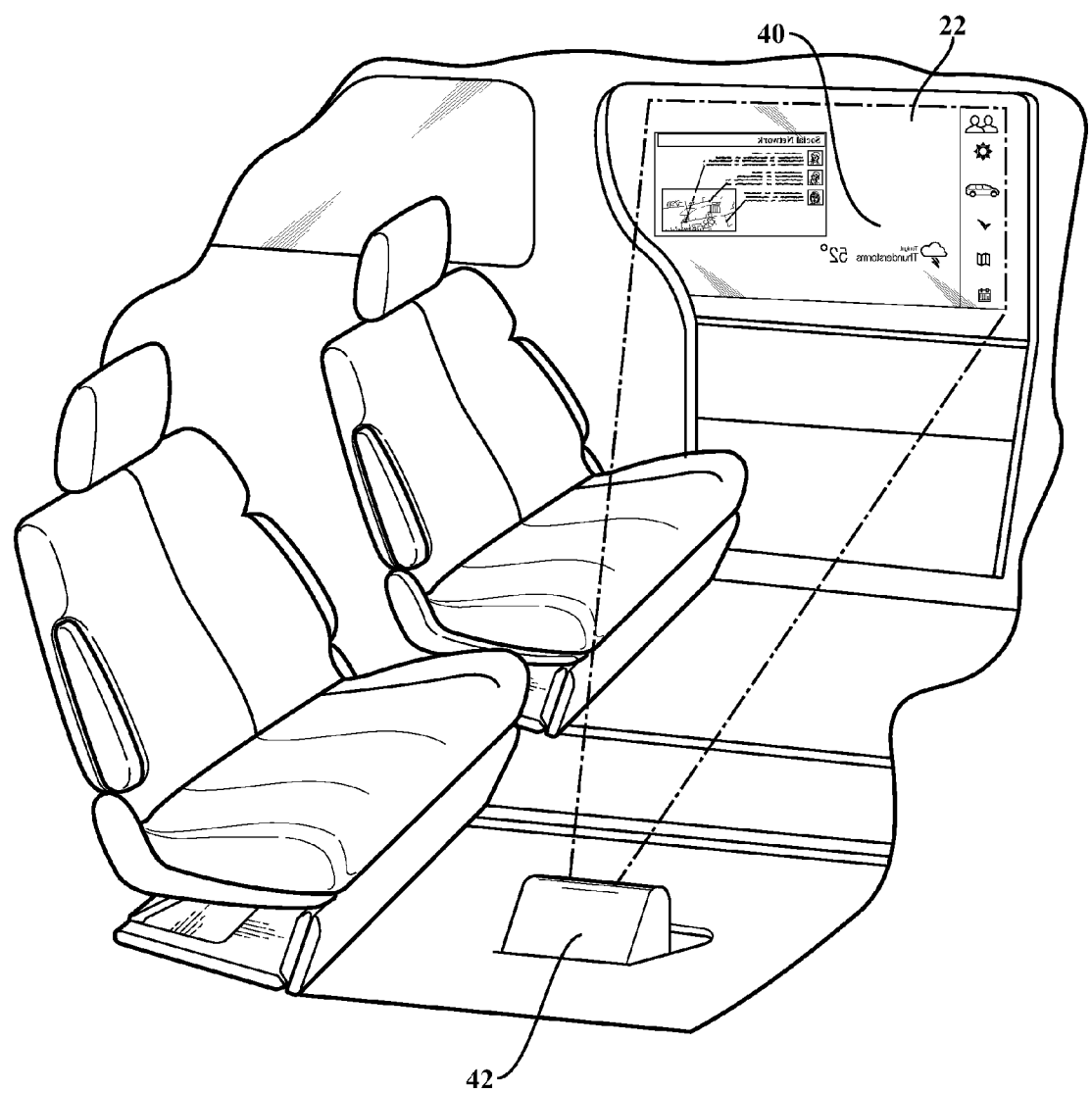
FIG. 3 is a partial interior view of the vehicle of FIG. 1.

In another non-limiting example, the interactive display subsystem 32 can include a coating 40 and a projector 42. The coating 40, for example, may be a polymer dispersed liquid crystal (PDLC) film, applied to the window 22 to provide both transparency when inactive (not used by the system for display) and partial or complete opacity when active (used by the system for display). The window 22 treated with the coating 40 is thereby configured to display content as a projection page visible from outside (FIG. 1) and/or inside the vehicle 20. The projector 42 can be mounted in the floor (FIG. 3) or other locations within the vehicle 20, such as the vehicle headliner or within a vehicle door structure as well as in locations on the vehicle exterior such as in an exterior door panel. The space within the dashed-dotted line that extends from the projector 42 toward the window 22 in FIG. 3 schematically represents the projection of social networking content onto the window 22.

The user identification subsystem 38 is configured to acquire data that enables the system 30 to detect and identify any users when they are present near or in the vehicle 20. In this context, detection refers to determining that a user is present nearby or inside the vehicle 20 and identifying refers to determining a specific identity of a user that is present nearby or inside the vehicle 20. The user identification subsystem 38 can also be configured to acquire data that enables the system 30 to detect any people (users and non-users) when they are located in or near the vehicle 20. In general, the user identification subsystem 38 includes one or more identification sensors 64 configured to acquire the aforementioned data, enabling the system 30 to identify a user when one is present. Social networking content that is subsequently displayed on a vehicle window 22 by the interactive display subsystem 32 is typically based, at least in part, on such identification.

Figure 4:
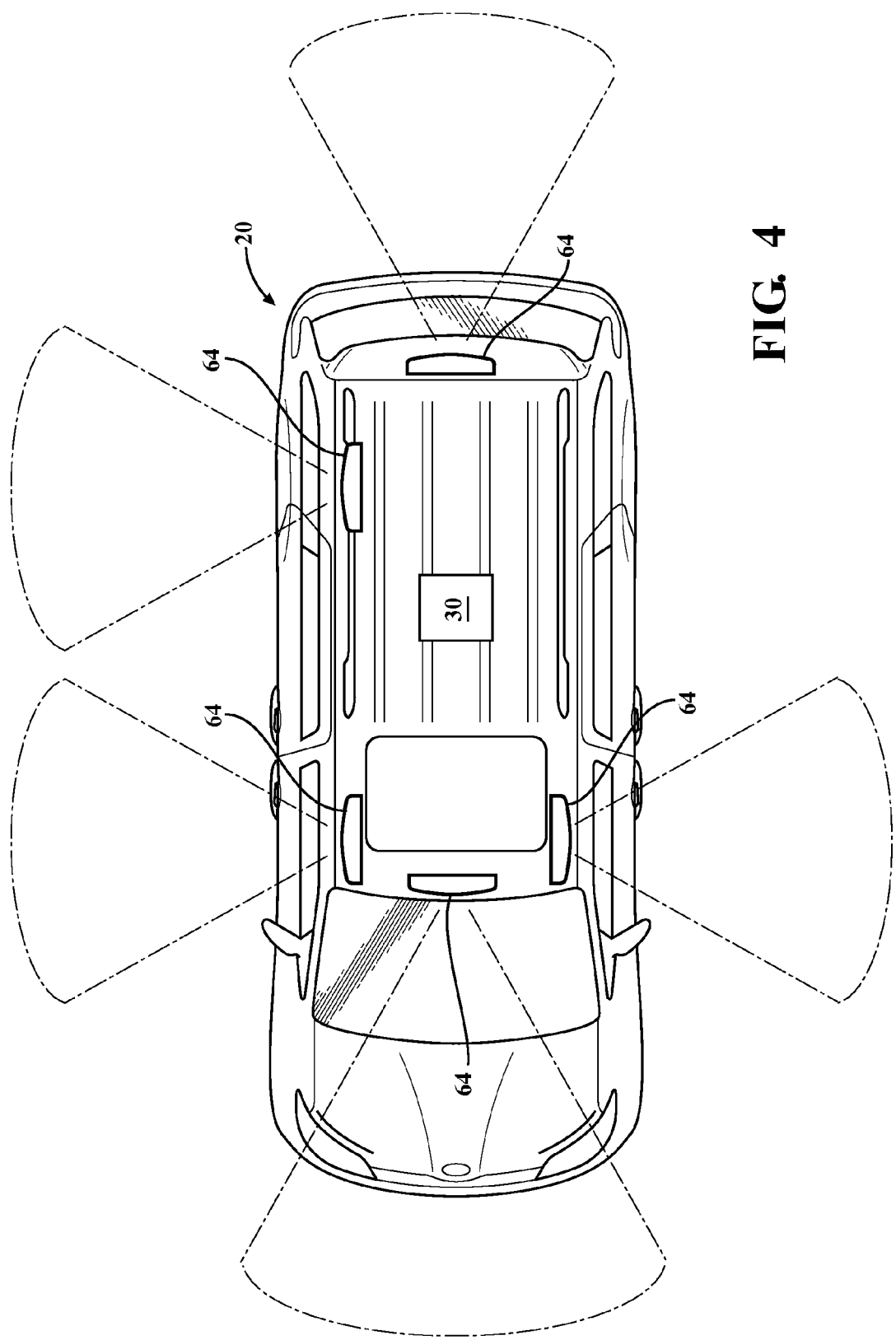
FIG. 4 is a top view of the vehicle illustrating exemplary portions of a user identification subsystem of the system of FIG. 2.

Non-limiting examples of identification sensors 64 include closed-circuit television (CCTV) camera, still camera, microphone, and infrared, thermal, or other sensors. Identification sensors are generally mounted to the vehicle 20 to provide a desired field of view external to the vehicle 20 as shown in FIG. 4, internal to the vehicle, or both. The user identification subsystem 38 can be configured to detect and/or identify one or more users of the system 30. In this context, detection refers to determining that a user is present nearby or inside the vehicle 20, and identifying refers to determining a specific identity of a user that is present nearby or inside the vehicle 20.

Figure 5:
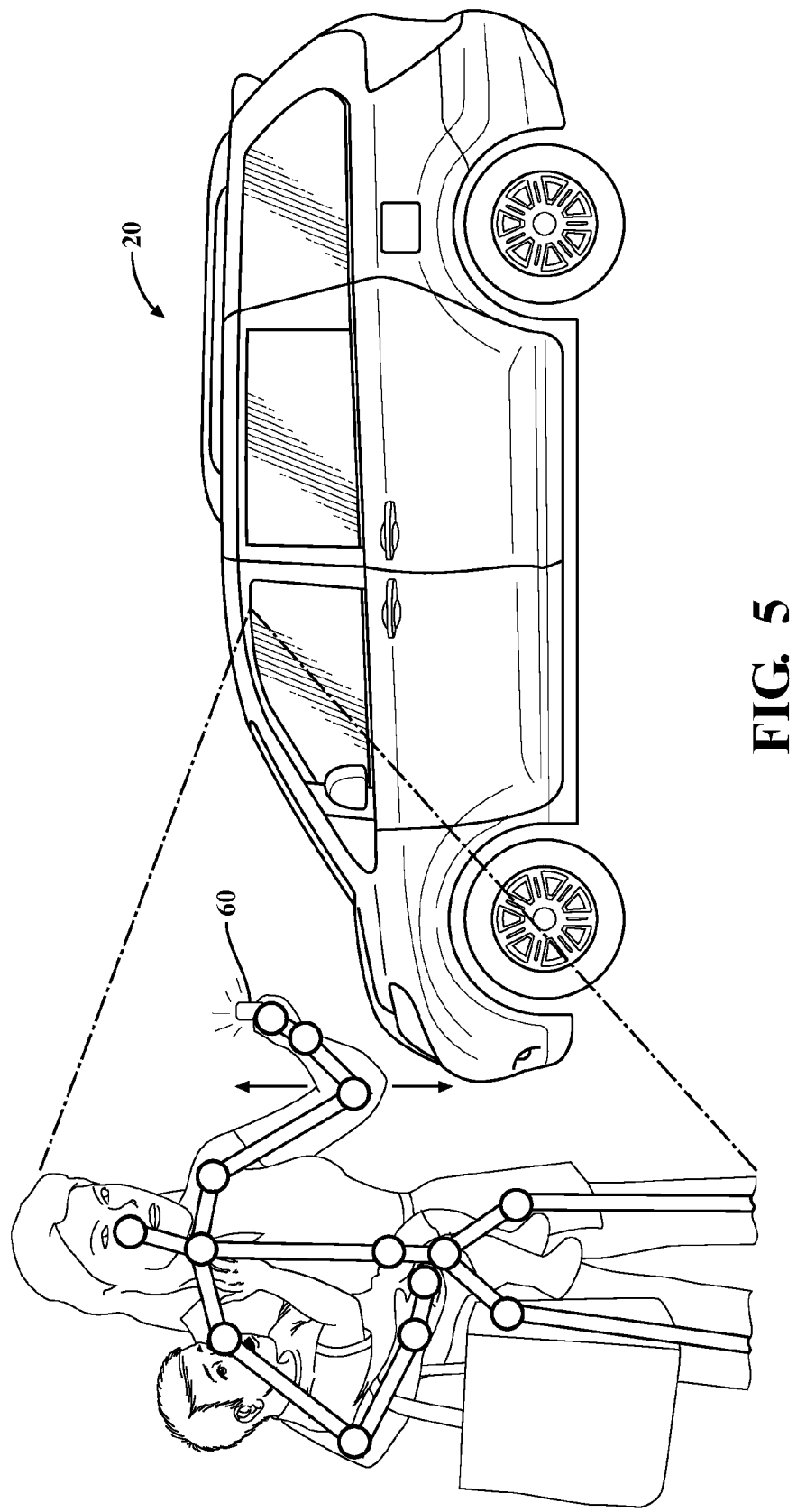
FIG. 5 is a pictorial representation of the vehicle illustrating user identification via a skeletal joint relationship, key fob and/or user gesture.

In some implementations, user detection, user identification, or both can be based on image data captured by identification sensors 64, e.g. a skeletal joint relationship 66 and/or other user-form data (FIG. 5). User detection, user identification, or both can alternatively, or in addition, be based on detection of a wireless device, such as the key fob 62, that is known to the system 30 and/or associated with a particular user.

The system 30 can store user profiles of known users, the user profiles including identification information relevant to individual users. For example, a user profile can contain skeletal joint relationship data, facial recognition data, or electronic device association data that the system 30 can use to detect and/or identify a user. For example, when a person approaches the vehicle 20, the user identification subsystem 38 can acquire data from the person with user identification sensors 64. The system 30 can then compare the acquired data to data stored in a library of user profiles. If the acquired data sufficiently match the stored data in any one of the user profiles, the approaching person is identified as the user associated with that user profile.

A user profile can additionally contain social networking registration information. Such social networking registration information can include identities or network addresses of social networking services with which the user is registered, along with any other needed information such as a username and password. Thus, once a user has been identified, the system 30 can log in to one or more social networking services with which user is registered or of which the user is a member, receive social networking content from them, and display the social networking content on a vehicle window using the interactive display subsystem.

In some variations, any or all information contained in a user profile can be stored on or shared with a personal electronic device 63, remote server, or other cloud 70 based system. Such offboard storage or sharing of user profile data can facilitate utilization of user profile data in other vehicles such as any additional vehicles owned by the user, rental vehicles, etc. Such user profile data can be secured by being accessible through a password protected application running on the cloud 70 based system, by biometric authentication, or by other effective means.

In some instances, a user profile can additionally contain user social networking automation preferences; data pertaining to whether or under what circumstances the user wishes the system 30 to automatically obtain or receive download content from a social networking service and/or automatically generate and transmit upload content to a social networking service. For example, the user profile associated with a user can indicate a preference that social networking content associated with that user not be externally displayed on a vehicle window. In another example, a user profile can indicate a preference that social networking content relating to that user not be automatically transmitted to a social networking service (i.e. that automatic trip status or user status updates not be implemented), or be sent at some selected time increment, geographic increment, etc. In another example, a user's profile can indicate a preference that automation of incoming and/or outgoing social networking information is turned off by default, but can be manually activated on a per-trip basis. In general, a user profile can contain data for full customization of automation, access, and display of a user's social networking content, including the ability to opt-in or opt-out of any or all features.

Registration of various user profiles with the system 30 can be completed in any manner, for example, over the internet or with a direct vehicle interface. User profiles can be based on the identities of individual users known to or registered with the system, or to user categories, such as "unknown user" or "valet". In different variations, a default user category such as "unknown user" or "valet" can be associated with limited, default access to system features, or can be associated with no access, i.e. complete prohibition of access to the system 30.

The control subsystem 34 generally includes a control module 50 with a processor 52, a memory 54, and an interface 56. The processor 52 may be any type of microprocessor having desired performance characteristics. The memory 54 may include any type of computer readable medium that stores the data and control algorithms described herein. Possible functions of the algorithm 58 are disclosed in terms of functional block diagrams (FIG. 6) and representative pages (FIGS. 8-14), and it should be understood by those skilled in the art with the benefit of this disclosure that these functions may be enacted in either dedicated hardware circuitry or programmed software routines capable of execution in a microprocessor based electronics control embodiment.

With continued reference to FIG. 2, the control module 50 may be a portion of a central vehicle control, a stand-alone unit, or other system such as a cloud-based system. Other operational software for the processor 52 may also be stored in the memory 54. The interface 56 facilitates communication with other subsystems such as the interactive display subsystem 32, the input subsystem 36, the user identification subsystem 38, and the user location subsystem 39. It should be understood that the interface 56 may also communicate with other onboard vehicle systems and offboard vehicle systems. Onboard systems include but are not limited to, a vehicle head unit 300 that communicates with vehicle sensors that provide, for example, vehicle tire pressure, fuel level and other vehicle diagnostic information. Offboard vehicle systems can provide information that includes but is not limited to, weather reports, traffic, and other information that may be provided via the cloud 70. In particular, the interface 56 can communicate with offboard servers or other cloud-based devices that host data on behalf of a social networking service.

The input subsystem 36 is generally configured to receive or generate upload content to be sent to a social networking service. The input subsystem 36 can receive upload content from a user, such as through an interactive display or a voice-recognition function. The input subsystem 36 can alternatively or additionally generate upload content, such as through the automatic operation of an onboard camera configured to generate image content at periodic intervals during a drive for transmission to a social networking service. A configuration of automatic generation of upload content will typically be subject to one or more settings in the system 30, such as preferences contained in a particular user profile.

The input subsystem 36 can include one or more input sensors including onboard input sensors 60, offboard input devices, or both. Onboard input sensors 60 can include one or more motion cameras or other light sensors configured to detect gesture commands, one or more touch sensors configured to detect touch commands, one or more microphones configured to detect voice commands, or other onboard devices configured to detect user input. The input subsystem can also include offboard input devices such as a key fob 62 and/or a personal electronic device 63 of the user, e.g. a tablet, smart phone, or other mobile device. In some instances, the input subsystem can include manually activated sensors, such as those mentioned above, as well as automatically activated sensors, such as an onboard camera, with an interior or exterior field of view, that generates image content at periodic intervals for transmission to a social networking service.

In some instances, at least one onboard input sensor 60 or offboard input device can be integrated into, or operate in conjunction with, the interactive display subsystem 32. In one non-limiting example, the interactive display subsystem 32 includes an LCD display integrated into a window 22 and can operate in conjunction with one or more touch sensors integrated into the window 22, causing the window to function as a touchscreen. In another non-limiting example, the interactive display subsystem 32 includes a projector 42 and coating 40 on the window 22 and can operate in conjunction with one or more motion detectors configured to detect user gesture commands, causing the window to operate as a gesture-based interactive display. Subsystem combinations involving the interactive display subsystem 32 and the input subsystem 36 that enable user interaction with a display on a vehicle window 22 are referred to herein as an interactive window display.

The user location subsystem 39 is configured to determine the location of one or more users inside or outside the vehicle. For example, the user location subsystem 39, working with the user identification subsystem 38, can generate data enabling the system 30 to determine that User A is in the driver seat, User B is in the front passenger seat, User C is in the right second-row seat, and User D is in the left second-row seat. The system can access user profiles of Users A-D, access one or more social networking services using login information for each of Users A-D, and display download content specific to each of Users A-D on the nearest adjacent window 22 for each. It will be appreciated that the system 30 will typically be configured to display download content on a driver window, or download content specific to a driver, only if the vehicle is stationary, if an automatic transmission is disengaged, if the engine is not running.

Typically, the user location subsystem 39 includes one or more location sensors 66 such as a seat pressure sensor, temperature sensor, or camera deployed inside or outside the vehicle. In some cases, a device can serve as both an identification sensor 64 and a location sensor 66. For example, a camera mounted within the vehicle can provide information on a user's specific identity, by means described above, and on the user's location within the vehicle, such as the driver's seat or the front-row passenger's seat. In some cases, elements of the interactive display subsystem 32 can also operate as location sensors 66 within the user location subsystem 39. For example, pressure sensors within a smartscreen or motion detectors operating as part of an interactive display can be used to obtain user location information.

In some instances, access to and display of social networking information can be based on user location as determined by the user location subsystem 39, possibly in conjunction with the user identification subsystem 36. For example, display of social networking information can be prohibited on a driver window when the vehicle is in motion. Additionally, when different users occupy different seats in the vehicle, a unique social networking page can be displayed on a window adjacent to each user, as determined by the user identification and user location subsystems 36, 39.

Figure 6:
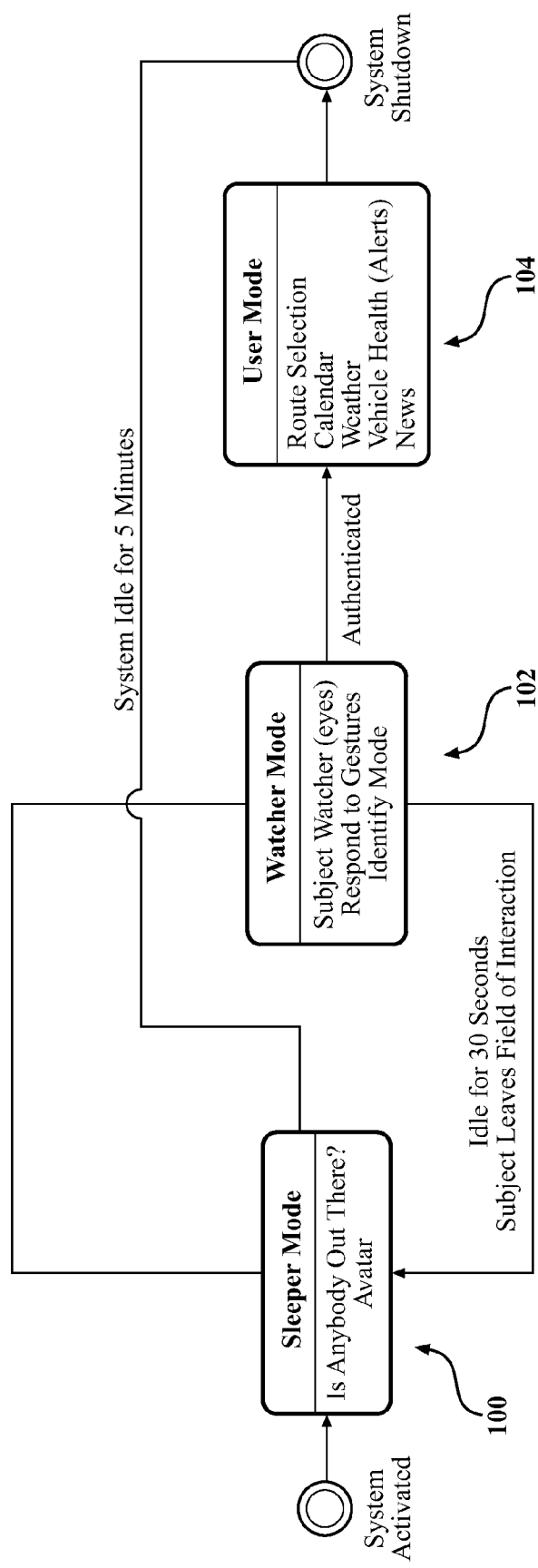
FIG. 6 is a schematic block diagram of an algorithm for operation of the system according to one non-limiting embodiment.

With reference to FIG. 6, operation of the system 30 according to one disclosed non-limiting embodiment generally includes a sleeper mode 100, a watcher mode 102, and a user mode 104. It should be appreciated that other modes may additionally or alternatively be provided.

If the system 30 is active but has yet to detect a user, the system 30 will be in sleeper mode 100 until awakened by the user identification subsystem 38. After detection but prior to identification by the system 30, the watcher mode 102 may be utilized to interact with authenticated as well as un-authenticated persons. In general, an "authenticated person" is a person who has been matched to a user profile, or identified by the system 30. An initial identification of a system 30 user at the beginning of a user/system 30 encounter can be called an authentication, and an authentication will tend to make system 30 functions available.

For example, when a person approaches the vehicle 20, the system 30 recognizes the direction from which the person has approached then activates the interactive display subsystem 32 to display an avatar, eyes, or other graphic. The graphic may be directed specifically toward the direction from which the person approaches, e.g., the graphical eyes "look" toward their approach. Alternatively, an audio capability allows the system 30 to respond to commands and initiate interaction from a blind side of the vehicle 20, i.e., a side without the interactive display subsystem 32. The watcher mode 102 utilizes the user identification subsystem 38 to discriminate between authenticated and un-authenticated persons.

In some implementations, the system 30 will be in electrical communication with a system battery that powers one or more identification sensors 64 when the system 30 is in sleeper mode 100. In some such implementations, the system will then derive power from a vehicle battery, such as a lead-acid battery, when the system 30 enters watcher mode 102 or user mode 104. Typically, the user mode 104 allows user-specific social networking data to be displayed, as directed by the relevant user profile.

A maximum range of content provision by the interactive display subsystem 32 may be associated with a maximum distance at which that social networking content can be effectively interacted with by the user. In one disclosed non-limiting embodiment, the maximum range of each content feature is prioritized with respect to legibility range of content displayed by the interactive display subsystem 32. This range metric facilitates the determination of the order in which content appears in the walkup experience. Access to prioritized content with greater maximum range allows the walkup experience to begin further from the vehicle 20 to provide the user with more overall time to interact with the system 30.

Figure 7:
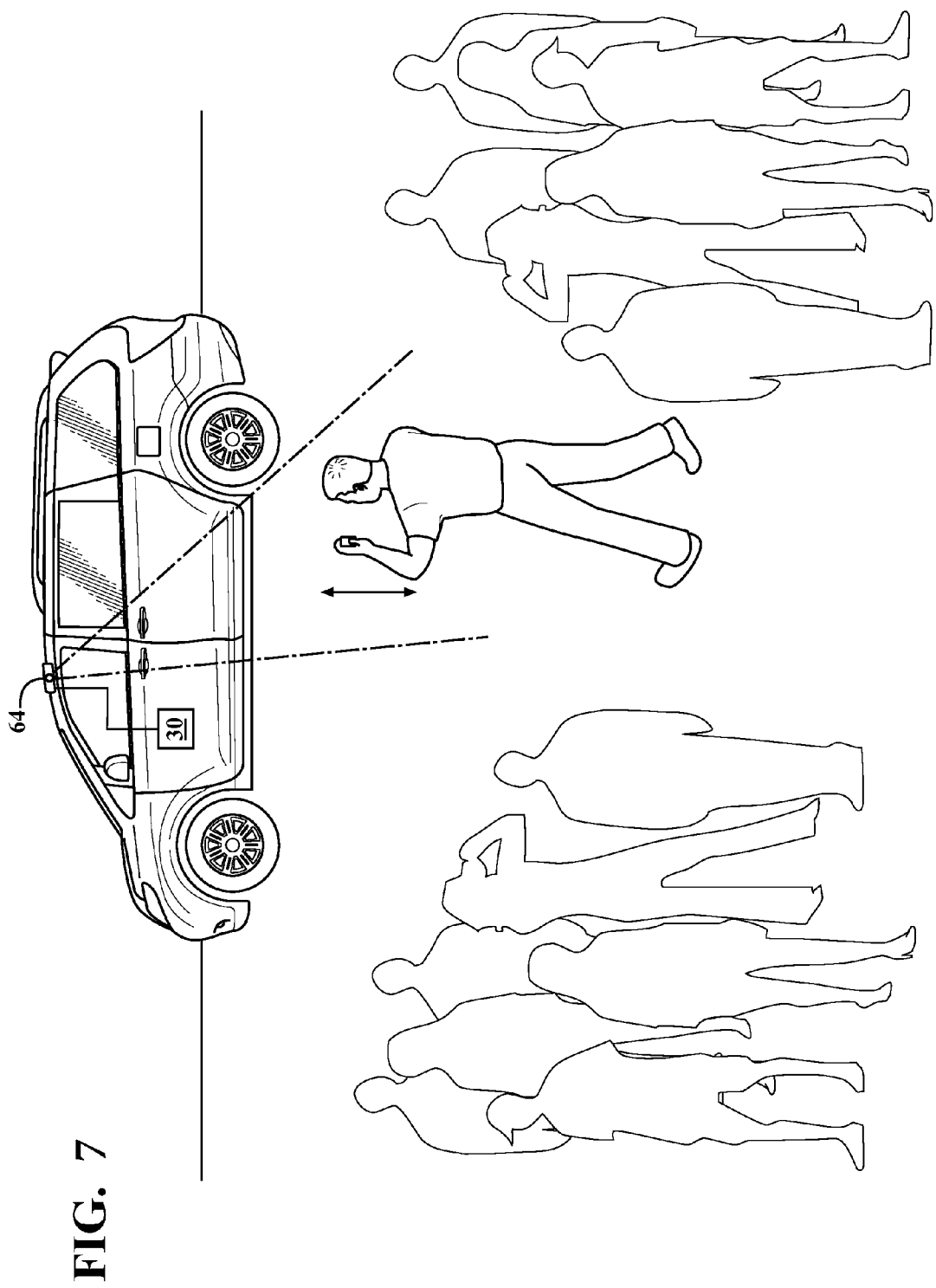
FIG. 7 is an illustration of an exemplary user gesture recognizable by the system.

In one disclosed non-limiting embodiment, the system 30 utilizes a multi-factor authentication for security and authorization. An example of multi-factor authentication may include the key fob 62, skeletal joint relationship recognition (FIG. 5), and/or a gesture password (FIG. 7). The user may be provisionally identified with one of these factors, but may require a total of at least two factors to authenticate the user prior to display of certain content. That is, the user will not be granted access to all the features in user mode 104 until a multi-factor authentication is passed and the user is within a predetermined range of the vehicle 20. This authentication process ensures the security of the vehicle and the personal information embedded in and/or accessed by the system 30. In one disclosed non-limiting embodiment, the first authentication factor is the key fob 62 and the second is the skeletal joint relationship (FIG. 7) of the user. If no recognized key fob 62 is present, the skeletal joint relationship may become the first authentication factor and a gesture password such as a wave or particular arm movement (FIG. 7) becomes the second.

The key fob 62 in one disclosed non-limiting example can be encrypted to uniquely identify each user to the system 30. Additional security protocols, such as a rolling time key to ensure that even the encrypted key cannot be intercepted and re-used by unauthorized devices, may additionally be utilized.

Once the user has been fully authenticated, all social networking features, to the extent they are enabled by the user profile, and download content received using information in the authenticated user's profile is validated for display. If the authentication fails, the user will not be granted access to information stored in or accessible by the system 30, to the vehicle 20 or both. The system 30 in this disclosed non-limiting embodiment allows full access at about 15-25 feet from the vehicle.

With respect to FIG. 7, to provide further authentication, the system 30 is configured to recognize a user by his skeletal joint relationships. Skeletal joint relationships in this disclosed non-limiting embodiment facilitate pre-authentication but not full authentication that grants full access to the vehicle 20. However, if the user has been pre-authenticated via the key fob 62, a matching skeletal joint relationship will fully authenticate the user. That is, the user identification subsystem 38 may utilize skeletal joint relationships as the second point of identification.

Figure 8:
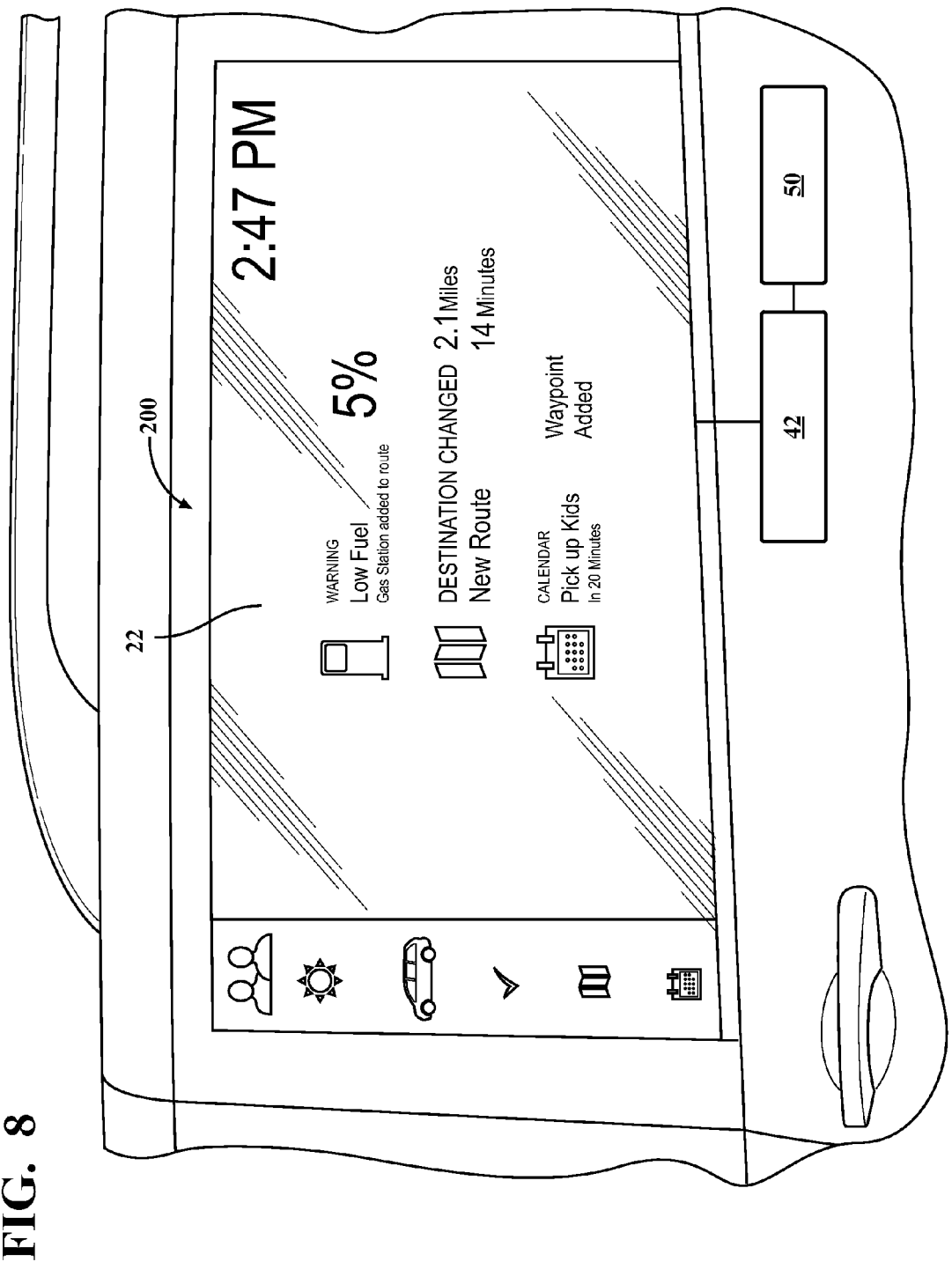
FIG. 8 is an exemplary landing page displayed by the automated social network interaction system.
Figure 9:
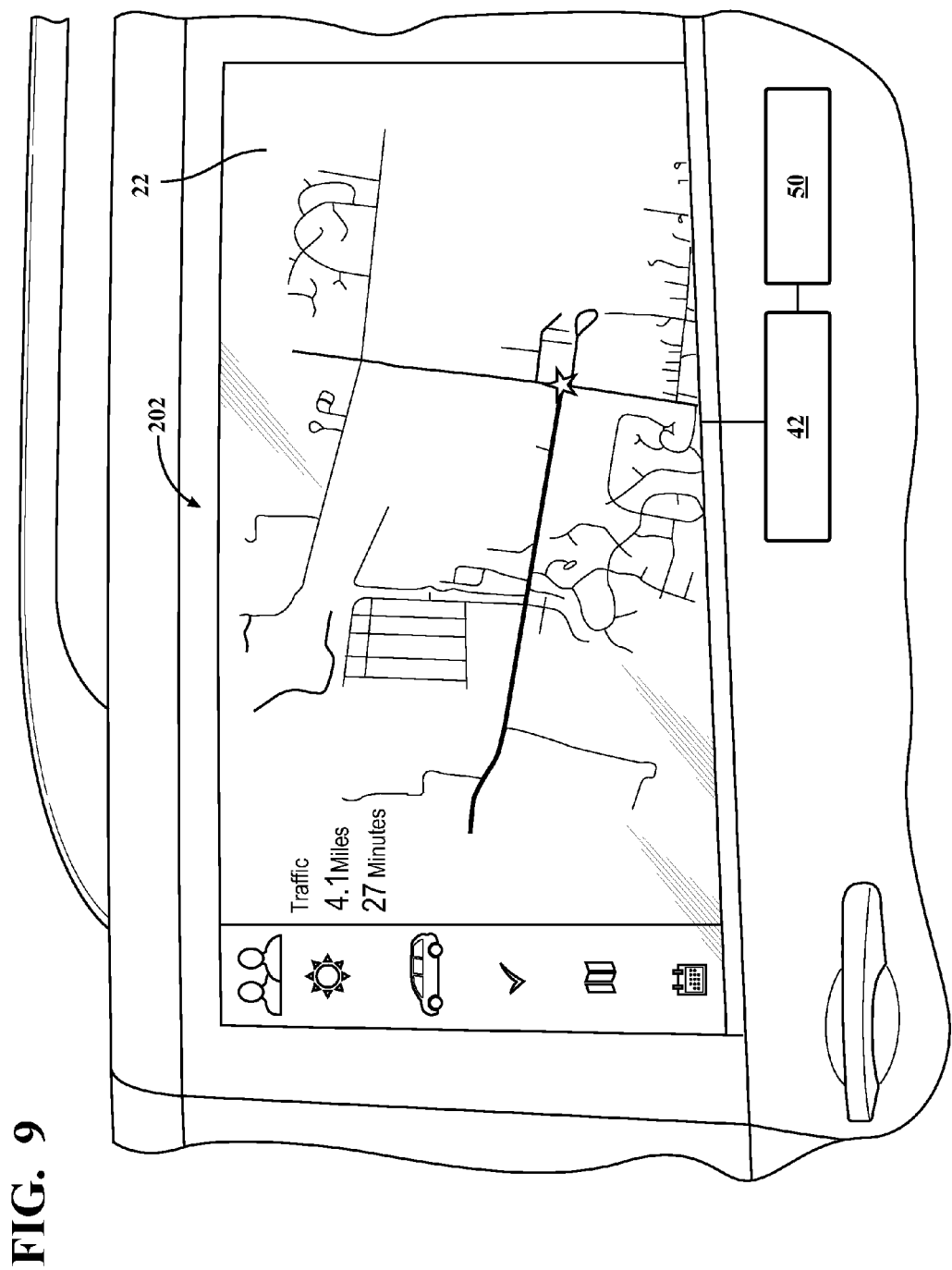
FIG. 9 is an exemplary route page displayed by the automated social network interaction system.
Figure 10:
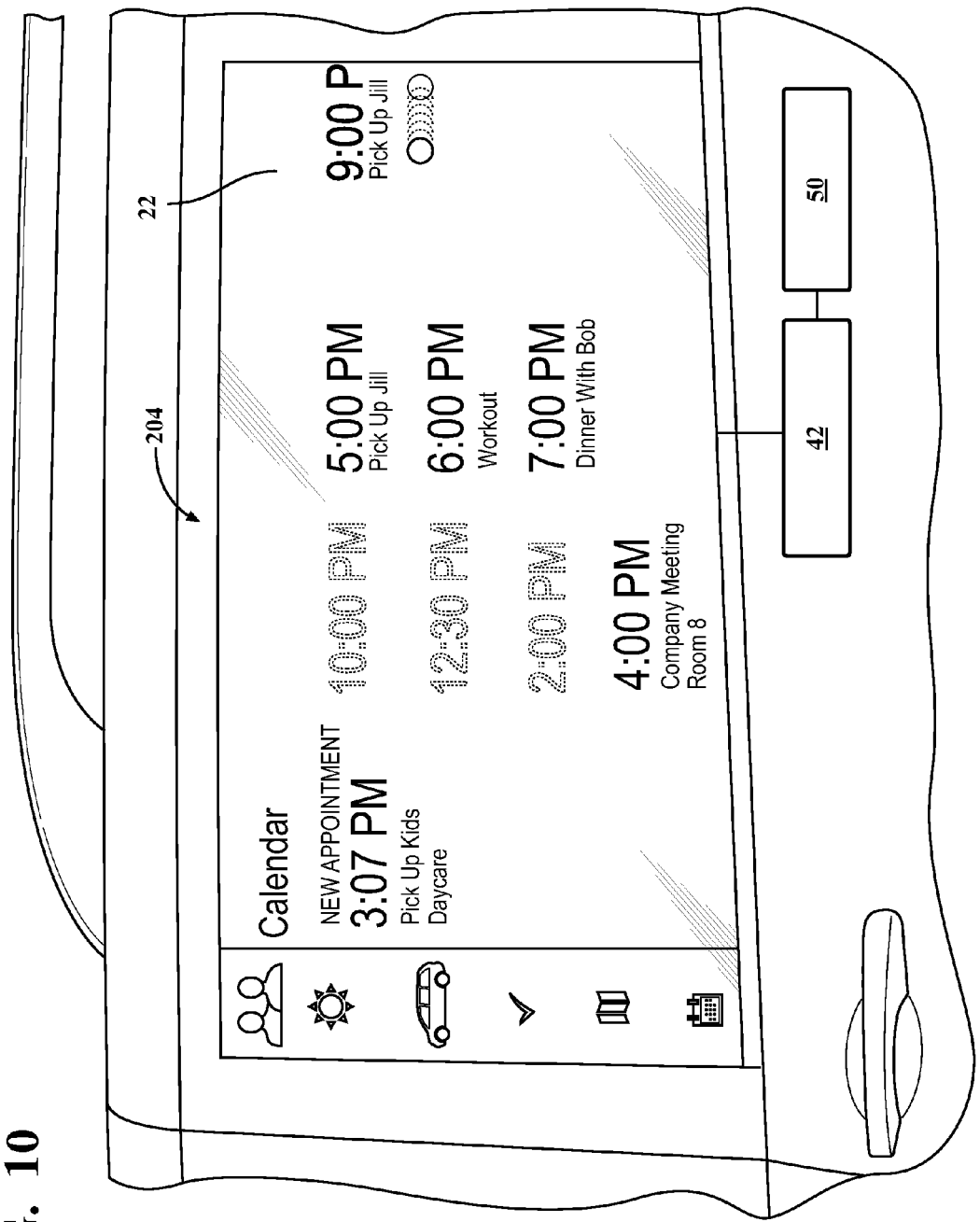
FIG. 10 is an exemplary calendar page displayed by the automated social network interaction system.
Figure 11:
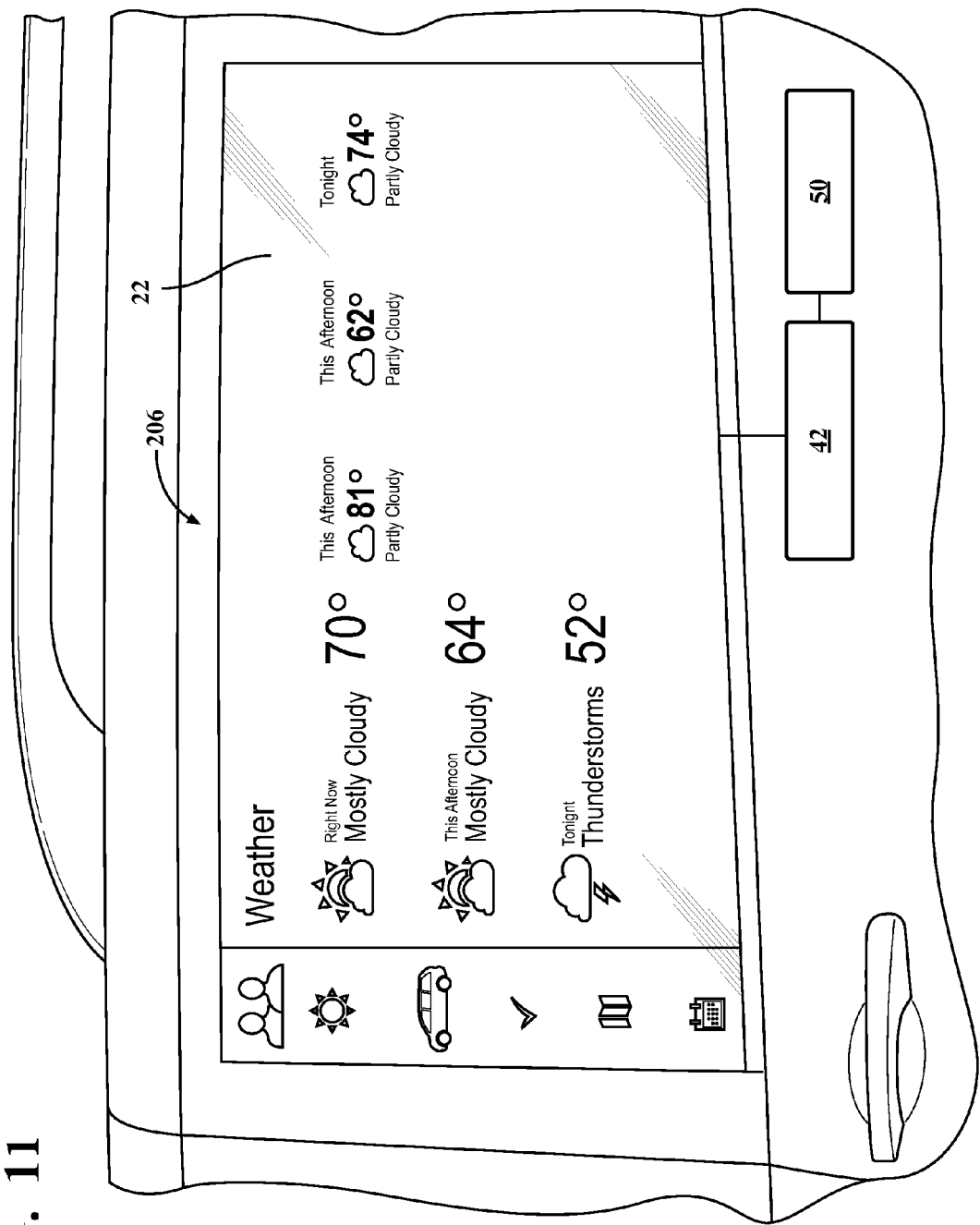
FIG. 11 is an exemplary weather page displayed by the automated social network interaction system.
Figure 12:
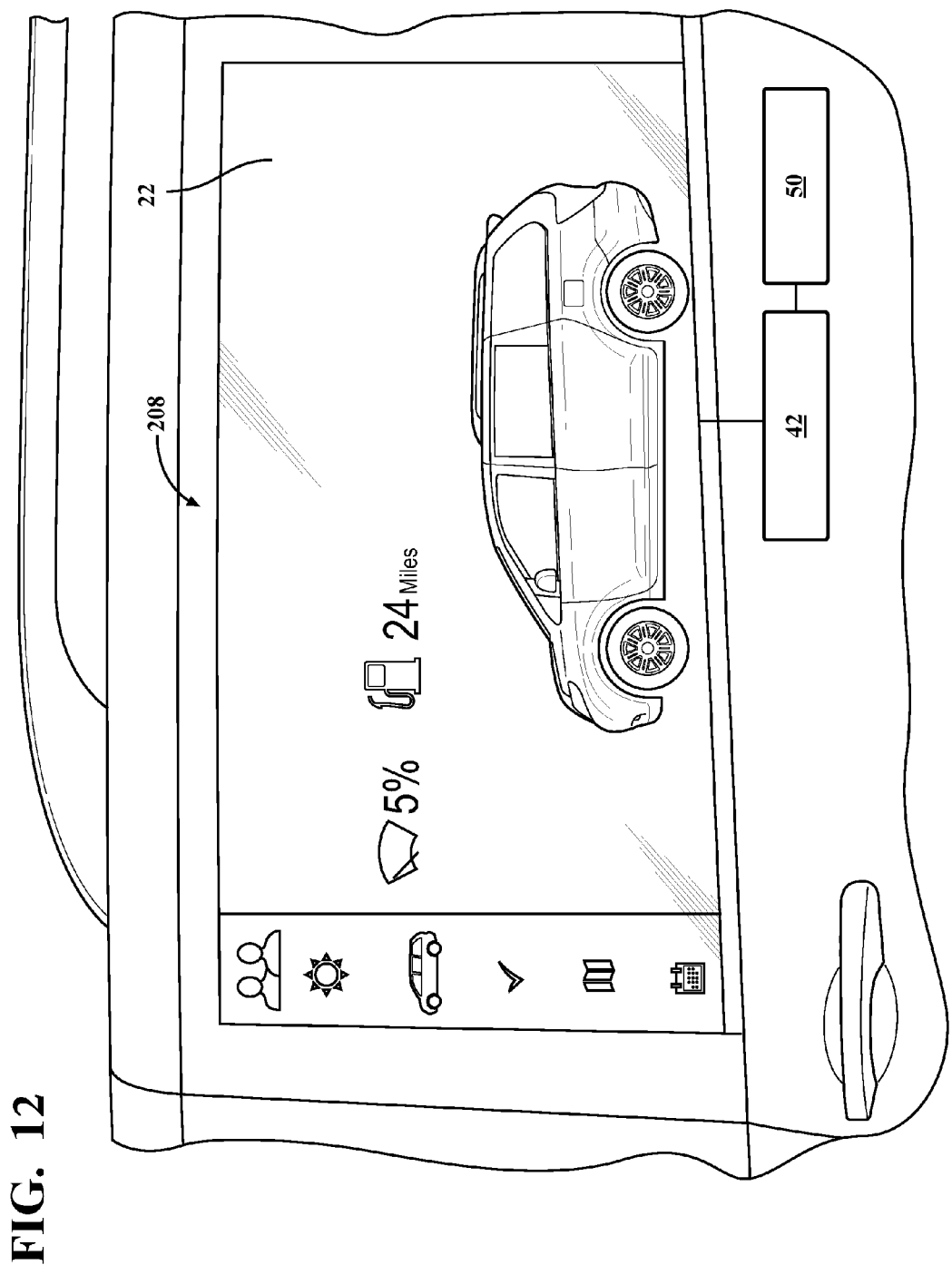
FIG. 12 is an exemplary vehicle status page displayed by the automated social network interaction system.
Figure 13:
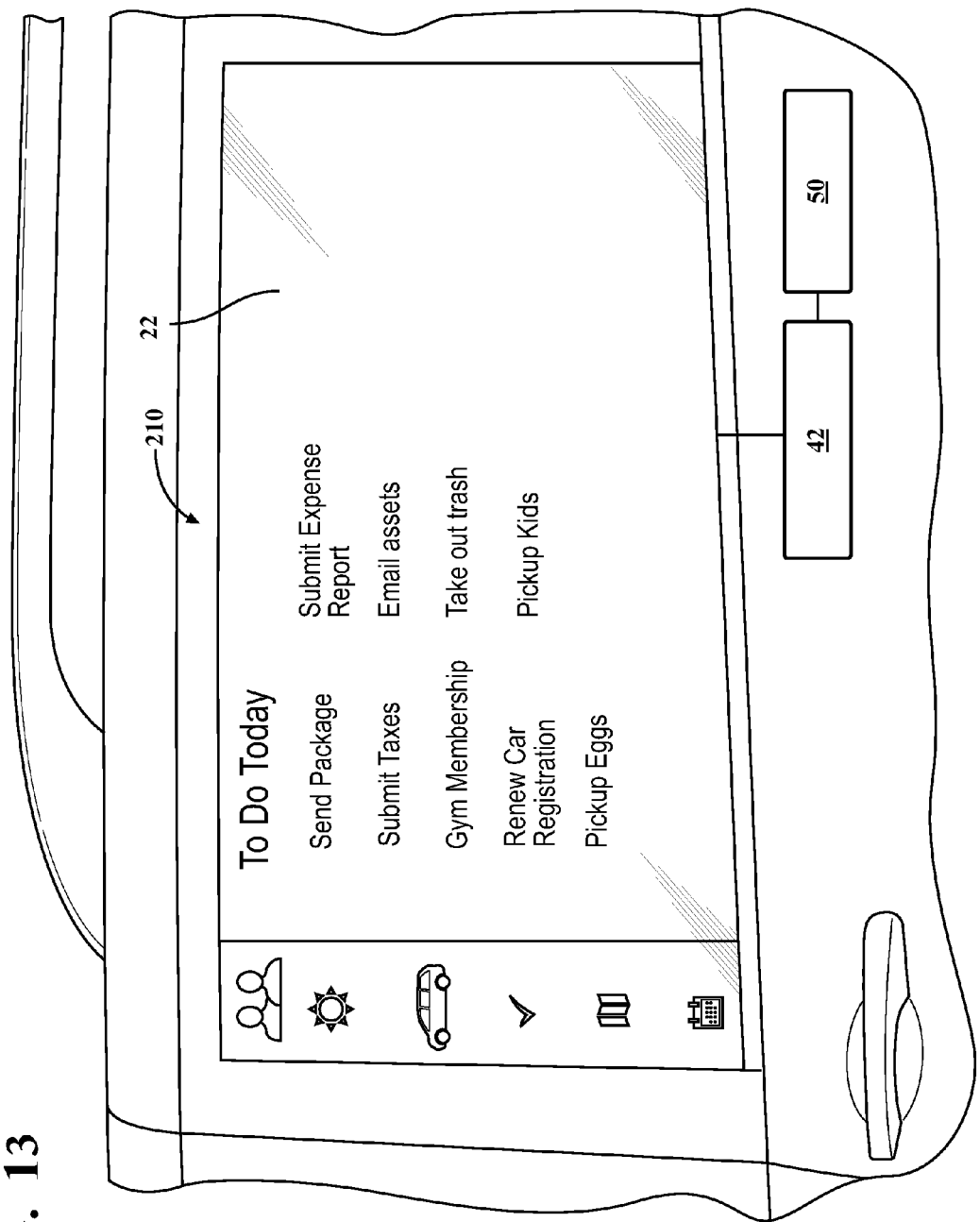
FIG. 13 is an exemplary to-do page displayed by the automated social network interaction system.

With reference to FIG. 8, once a user is identified or authenticated, the interactive display subsystem 32 can produce a "landing" or "home" page 200 on a vehicle window 22 facing the user. The landing page 200 can provide an overview of data received from a social networking service, or can provide links to additional pages, including one or more social networking pages or other pages associated with download content.

In some examples, the user can select content, including download content, with the key fob 62, gestures, voice commands, touch inputs, etc. In one example, the user utilizes the key fob 62 to cycle through various pages displayed by the interactive display subsystem 32. In one example, the key fob 62 may include a four button directional pad and two auxiliary buttons. Alternatively, hand gestures may be used to "swipe" between pages. It should be appreciated that although particular pages are illustrated in the disclosed non-limiting embodiment, various alternative or additional pages may be provided.

Figure 14:
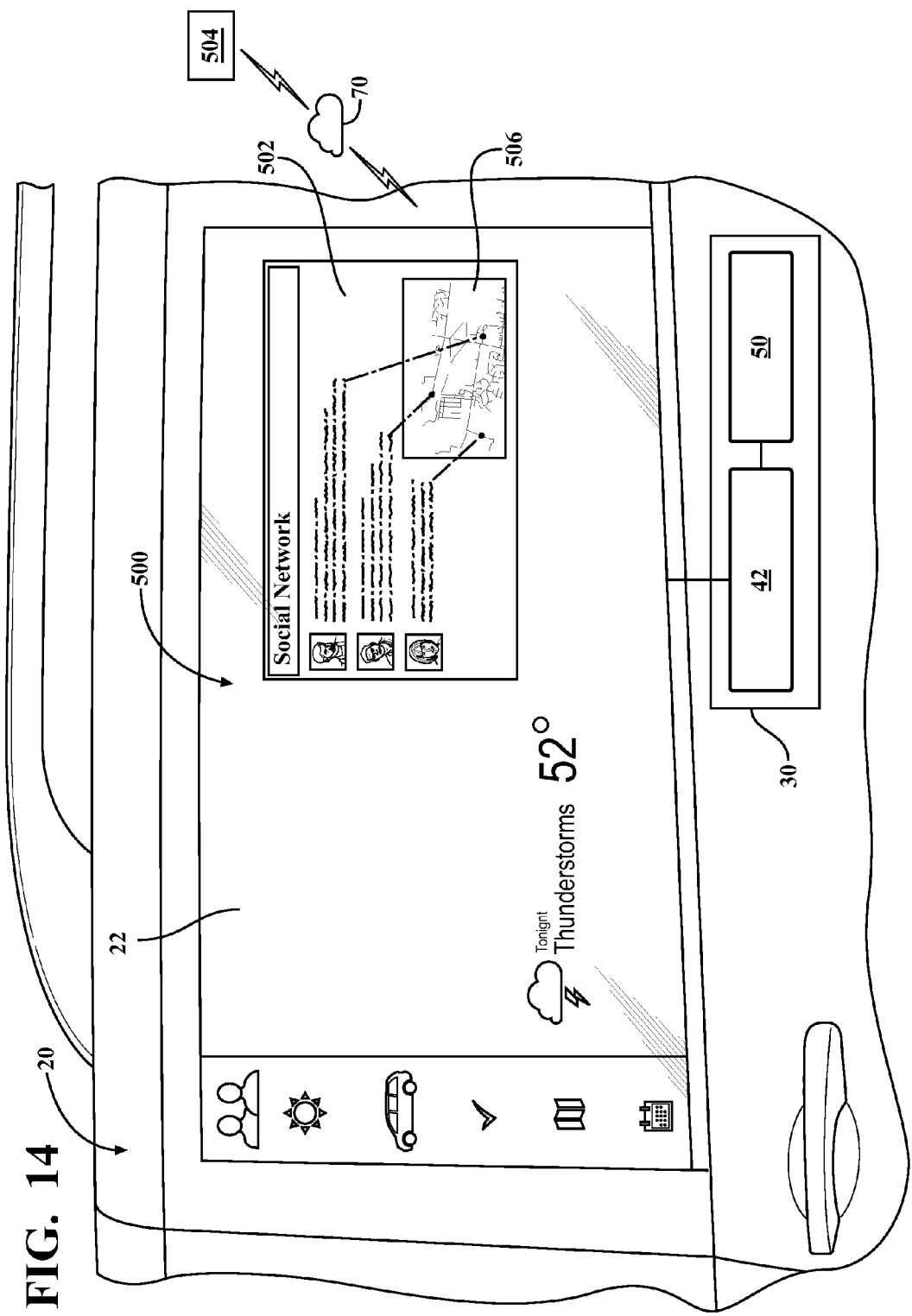
FIG. 14 is an exemplary social networking page that posts a map of friends displayed by the automated social network interaction system.

FIGS. 9-14 show examples of various pages that can be accessed from the landing page 200 including a route page 202 (FIG. 9), calendar page 204 (FIG. 10), weather page 206 (FIG. 11), vehicle status page 208 (FIG. 12), schedule page 210 (FIG. 13), and of particular significance to the present disclosure, a social networking page 500 (FIG. 14).

The exemplary social networking page of FIG. 14 presents download content to the authenticated used during "walk-up". The download content displayed on the social networking page can be that of a single social networking service, presented as a webpage of the single social networking service. The download content displayed on the social networking page can include a collection of content from multiple social networking services, with a headline identifying each of the multiple social networking services. The download content displayed on the social networking page can be grouped into different types, such as "public posts," "private messages," "requests," "hyperlinks," "video," etc. The social networking page can also include one or more user prompts indicating options such as an option to manually input upload content and an option to activate automatic generation of upload content of one or more types.

In another example, the system 30 can utilize information received from one or more social networking services to identify current locations of one or more social networking associates of a user. The social networking page 500 displayed to that user can include a map 506 that indicates where each social networking associate is currently located as the user approaches or occupies the vehicle 20.

In operation, upon approach to the vehicle 20, the system 30 recognizes a user with a first and second point of identification and accesses the desired social media applications of the recognized and authenticated user for display on the social networking page 500. This authentication process ensures the security of the personal social media information yet permits social media interaction prior to user entry into the vehicle 20.

Alternatively, or in addition, the social networking page 500 may be displayed for viewing from inside the vehicle 20. Display of a social network page 500 for viewing from inside the vehicle can be on a window 22 or elsewhere. The social networking page 500 is displayed within the vehicle 20 such that one or more passengers can interact therewith while the vehicle 20 is in operation. As mentioned above, display of download content or any other content to a driver operating the vehicle 20 will typically be restricted. It should be appreciated that various regulations may otherwise control such interior display.

Whether displayed for viewing from outside the vehicle, inside the vehicle or both, the social networking page 500 can be updated manually, at regular intervals, or in any other useful way.

In one disclosed non-limiting embodiment, once the user enters the vehicle 20, the system 30 will communicate with the offboard social media application to update the social media status of the user to "driving," or "in route."

In another aspect, the present disclosure provides a non-transitory computer-readable storage medium. The computer storage medium contains computer-readable instructions that, when executed by a processor, performs operations related to an automated social network interaction system for a vehicle. The operations can include a step of identifying a vehicle user. The operations can also include a step of logging-in to a social networking service in response to identifying the user, and receiving download content from the social networking service. The operations can also include a step of displaying the download content on a vehicle window. Still further, the operations can also include a step of transmitting upload content to the social networking service.

In an example describing multiple aspects of the present disclosure, User A and User B, who are about to go on a four hour drive to visit relatives, walk out their front door. As Users A and B approach the vehicle 20, identification sensors 64 detect their presence and the system 30 switches from sleeper mode 100 to watcher mode 102. In watcher mode 102, additional user identification sensors 64 and user location sensors 66 are activated, enabling the system 30 to authenticate each of Users A and B, to determine that User A is approaching the driver's door and that User B is approaching the front passenger's door, and to switch to user mode 104.

The system displays individualized social networking pages 500 to Users A and B on the driver's door and front passenger door windows, respectively. User B responds to a comment made by a social networking associate by posting to the relevant social networking surface using the interactive window display integrated in the front passenger window. User A, with a voice command, enables the system to automatically generate upload content during the drive, according to settings in User A's user profile.

Figure 15:
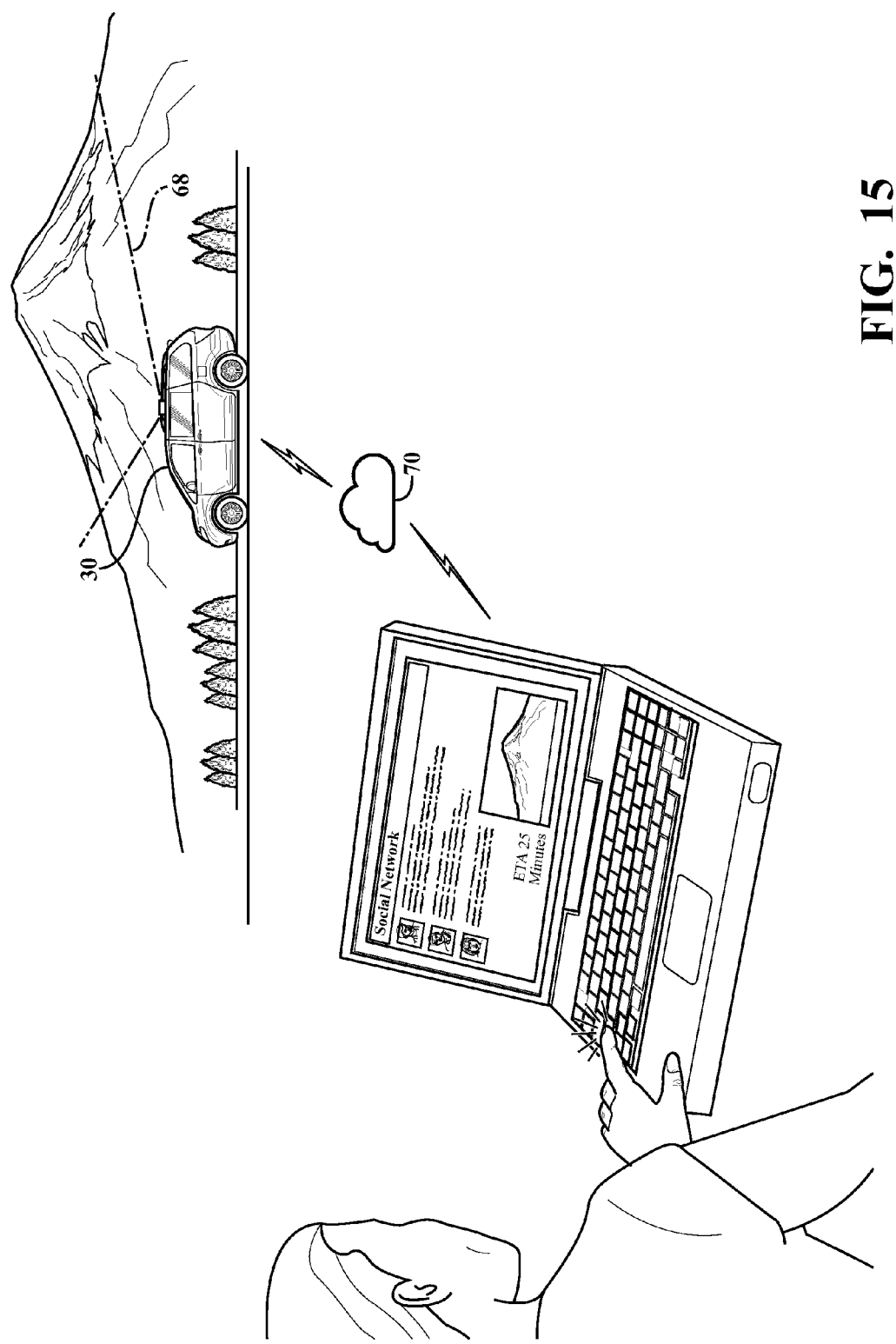
FIG. 15 is a schematic view of a social media update that posts an image of a landmark to a social media application from the vehicle.

Users A and B get into the car and the system 30 posts a comment ("Leaving for Mom and Dad's house. ETA four hrs.") to User A's account on social networking service X as User A starts the engine. During the drive (FIG. 15), the vehicle's navigation system periodically prompts the system 30 to take a picture of the passing landscape, particularly when the vehicle is passing a landmark or other designated point. The system 30 posts the picture to User A's account on social networking service X, along with a text-based comment such as "Passing Mt. Clancy. ETA 45 minutes." As User A and User B reach their destination, the system 30 posts a comment to User A's account on social networking service X, "Arrived at mom and dad's house."

It should be appreciated that the user may preset various desired levels of social media detail within the system 30, so as to provide a desired social media update rate.

The use of the terms "a," "an," "the," and similar references in the context of the description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom. It should also be appreciated that functions discussed in relation to a particular component or subsystem of the system 30 can instead be fulfilled by a different component or subsystem, and that the functions discussed herein can be grouped in different ways.

Although particular step sequences are shown, described, and claimed, it should be understood that steps may be performed in any order, separated, or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A system for automatically presenting a vehicle user with social media updates, the system comprising:
   a user identification subsystem configured to detect a user and determine the user's identity;
   a user location subsystem configured to determine a user location inside the vehicle;
   a control subsystem configured to:
      access a user profile associated with the determined user's identity, and containing login information for at least one social networking service based on the user's identity;
      transmit the login information to the at least one social networking service;
      retrieve social media content from the at least one social networking service based on the login information;
      identify a vehicle window proximate to the user location; and
   an interactive display subsystem configured to display, on the identified vehicle window, the social media content retrieved by the control subsystem, the displayed social media content oriented to be read from the user location inside the vehicle.

2. The system as recited in claim 1, wherein the displayed social media content includes a social networking page.

3. The system as recited in claim 1, wherein the displayed social media content includes a map that identifies a location of a social networking associate of the user.

4. The system as recited in claim 1, wherein the system is configured to access a user profile that contains social network service registration information for the user.

5. The system as recited in claim 1, further comprising an input subsystem in communication with the control subsystem, the input subsystem configured to receive upload content from a user,
   wherein the system is configured to transmit the upload content to the social networking service.

6. The system as recited in claim 5, wherein the system is configured to automatically generate and transmit upload content to the social networking service.

7. A system for a vehicle, comprising:
   a user identification subsystem configured to identify a first user and a second user;
   a user location subsystem configured to determine a location of the first user and of the second user;

an interactive display subsystem configured to show a first display content on a first vehicle window and to show a second display content on a second vehicle window; and a control subsystem in communication with the user identification subsystem, the user location subsystem and the interactive display subsystem, wherein the system is configured to login to at least one social networking service account for each of the first user and the second user; to receive a first download content for the first user from the at least one social networking service and to receive second download content for the second user from the at least one social networking service; and wherein the first display content is derived from the first download content if the first user is located nearer the first window than the second window and the first display content is derived from the second download content if the first user is located nearer the second vehicle window than the first vehicle window.

8. A non-transitory computer-readable medium, associated with a vehicle, and having instructions embodied thereon that, when executed by a processor, perform operations comprising:

identifying a user of a vehicle;
determining a user location inside the vehicle;
identifying a vehicle window proximate to the user location;
logging the user into a social networking service;
receiving download content from the social networking service; and
displaying the download content on the identified vehicle window, the displayed download content oriented to be read from the user's location inside the vehicle.

9. The non-transitory computer-readable medium as recited in claim 8, wherein the operations further comprise transmitting upload content to the social networking service.

10. The non-transitory computer-readable medium as recited in claim 9, wherein the upload content is automatically generated by a vehicle device.

11. The non-transitory computer-readable medium as recited in claim 10, wherein the vehicle device is a camera.

* * * * *

UNITED STATES PATENT AND TRADEMARK OFFICE
CERTIFICATE OF CORRECTION

PATENT NO.         : 9,807,196 B2
APPLICATION NO.    : 14/639695
DATED              : October 31, 2017
INVENTOR(S)        : James T. Pisz Page 1 of 1

It is certified that error appears in the above-identified patent and that said Letters Patent is hereby corrected as shown below:

In the Claims

Column 12, Line 28 Claim 1, reading "the vehicle" should read --a vehicle--

Column 12, Line 57 Claim 5, reading "a user" should read --the user--

Column 13, Line 12 Claim 7, reading "receive second download" should read --receive a second download--

Signed and Sealed this
Twenty-first Day of May, 2019

Andrei Iancu
*Director of the United States Patent and Trademark Office*